United States Patent
Schwartz

(10) Patent No.: US 9,171,299 B1
(45) Date of Patent: Oct. 27, 2015

(54) ISOLATED PAYMENT SYSTEM

(71) Applicant: International Business Machines Corporation, Armonk, NY (US)

(72) Inventor: Robyn R. Schwartz, Deerfield, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/454,361

(22) Filed: Aug. 7, 2014

(51) Int. Cl.
| G06K 15/00 | (2006.01) |
| G06Q 20/14 | (2012.01) |
| G06Q 20/32 | (2012.01) |
| G06Q 20/38 | (2012.01) |

(52) U.S. Cl.
CPC ............... *G06Q 20/14* (2013.01); *G06Q 20/32* (2013.01); *G06Q 20/3821* (2013.01)

(58) Field of Classification Search
CPC . G06K 7/0004; G06K 7/10881; G06Q 20/02; G06Q 20/04; G06Q 20/12; G06Q 20/32; G06Q 20/3226; G06Q 20/3227; G06Q 20/3433; G06Q 20/352; G06Q 20/353; G06Q 20/40; G07F 7/02; H04B 1/3816
USPC ................ 235/380, 383, 385; 705/39, 41, 44
See application file for complete search history.

(56) References Cited

U.S. PATENT DOCUMENTS

| 7,540,408 | B2 * | 6/2009 | Levine et al. ................. 235/379 |
| 8,065,200 | B2 | 11/2011 | Schwartz |
| 8,253,727 | B2 | 8/2012 | Schwartz |
| 8,639,621 | B1 * | 1/2014 | Ellis et al. ........................ 705/41 |
| 8,851,369 | B2 * | 10/2014 | Bishop et al. ................. 235/380 |
| 2004/0019564 | A1 * | 1/2004 | Goldthwaite et al. .......... 705/44 |
| 2012/0036042 | A1 * | 2/2012 | Graylin et al. ............. 705/26.41 |
| 2012/0072350 | A1 * | 3/2012 | Goldthwaite et al. .......... 705/44 |
| 2012/0158580 | A1 * | 6/2012 | Eram et al. ...................... 705/39 |
| 2013/0325701 | A1 | 12/2013 | Schwartz |

OTHER PUBLICATIONS

Morgan Stanley, "Mobile Payments: The Coming Battle for the Wallet", Jan. 8, 2014, 1 page.

* cited by examiner

*Primary Examiner* — Seung Lee
(74) *Attorney, Agent, or Firm* — John Pivnichny

(57) ABSTRACT

A payment company separate from a retailer runs a payment application having credentials on a server computer. There are wireless personal portable interfaces belonging to the payment company but located in real and virtual retail, showrooms. The retailer agrees to the credentials of the payment company, which include prespecified real and virtual currencies for remittance. Credentials also include rules regarding limitations on acceptance of remittance in virtual currencies. A customer having a personal portable device enters a showroom and selects merchandise to purchase. She selects a payment company who remits payment to the retailer according to the credentials.

17 Claims, 3 Drawing Sheets

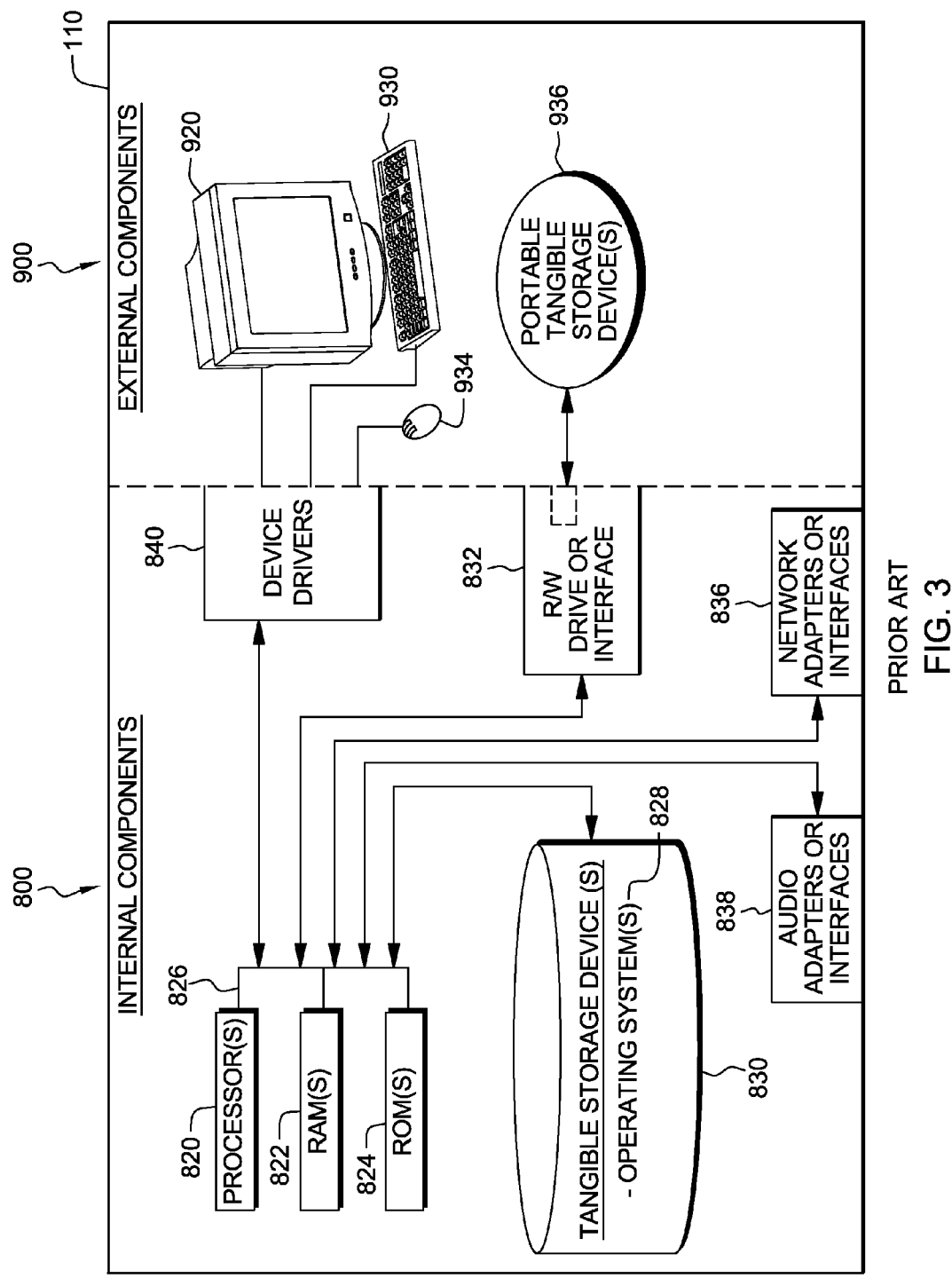

ISOLATED PAYMENT SYSTEM

BACKGROUND OF THE INVENTION

1. Field of the Invention

The invention relates to payments to a retailer by a separate payment company for retail merchandise purchased by a customer. More specifically, the invention relates to a retailer accepting the credentials of a payment company and the customer selecting a payment company using an electronic device such as a wireless personal portable device.

2. Description of the Related Art

A recent great change factor in retail sales has been the deconstruction of customer experience cycle process points to modularized events. This has been driven in part by customers taking control of their retail experience via greater access enabled through technology, and in part enabled by dynamic retail playing fields. For example, a customer may go use a search engine to research some product. They turn to social media for reviews of that same product. They may use a pricing spider to find the "best value". They may go back to the search engine for a value-based search on that product for intent to purchase. Then, they may go to a retailer (online, or real brick and mortar, or social) to purchase and then choose across delivery options. Retail has and is becoming more and more embedded in other facets and channels—including horizontal or electronic social venues. This is furthering the decomposition of the retailing experience from a destination to ubiquity. As retailing becomes more faceted and embedded, the challenge for the retailer is to also become more faceted and pervasive leveraging new and emerging channels of interaction and communication.

BRIEF SUMMARY OF THE INVENTION

At the point of payment, the options are a combination between those payment solutions that the customer has "opted" into and those for which the retailer has accepted the credentials of payment companies. The customer has deconstructed the retail experience to a set of modularized functions that work across multiple participating activities. In particular, the payment process is an isolated process which because of increased flexibility, eases the relationship across all entities acting inside of the overall retail customer experience cycle-browse through procurement to after-service.

Technology and new and emerging monetization models for participating business entities have increased collaboration and eased the relationship across all such activities. As the entities define and re-invent means of monetization, including use of various real and virtual currencies (including barter), the customer experience creates opportunity for differentiation and new engagement models. The isolated payment system of the present invention is one such opportunity.

By isolating the payment cycle, there could be found benefit to any entity, given visibility into some part of a customer's decision to purchase, e.g., the "moment of truth." The retailer divesting of the responsibility of the payment transaction to a payment company, retains the other parts of their brand experience while being able to remove themselves from the liability and responsibility of the payment transaction in and of itself. The retailer is still beholden to the customer for their overall product experience. The customer decides which payment company to use. The payment transaction is now an agreement between the payment company and the customer with the retailer being on the remittance end.

The retailer makes a determination to either accept or not the credentials of the payment company, as opposed to, assessing the customer "in front of them" via an offline data verification method.

Mobility technology enables new paradigms of transaction relationship management for reasons, such as:

- The mobile device/phone is a customer owned device and puts the customer 'in charge' of their own payment transaction interaction.
- The mobile device/phone can participate in a secure interaction (behavioral, hardware, or software) in support of a payment transaction experience.
- The customer is fully participating and has access to a transparent interaction.
- The customer has opportunity to benefit (selling, bartering their own transaction data, or improve their opportunistic interest rates).

BRIEF DESCRIPTION OF THE SEVERAL VIEWS OF THE DRAWINGS

FIG. 3 is a system diagram of a computer hardware and software product for use in implementing portions of the present invention.

DETAILED DESCRIPTION

For a better understanding of the present invention, together with other and further objects, advantages, and capabilities thereof, reference is made to the following disclosure and the appended claims in connection with the above-described drawings.

Figure 1:
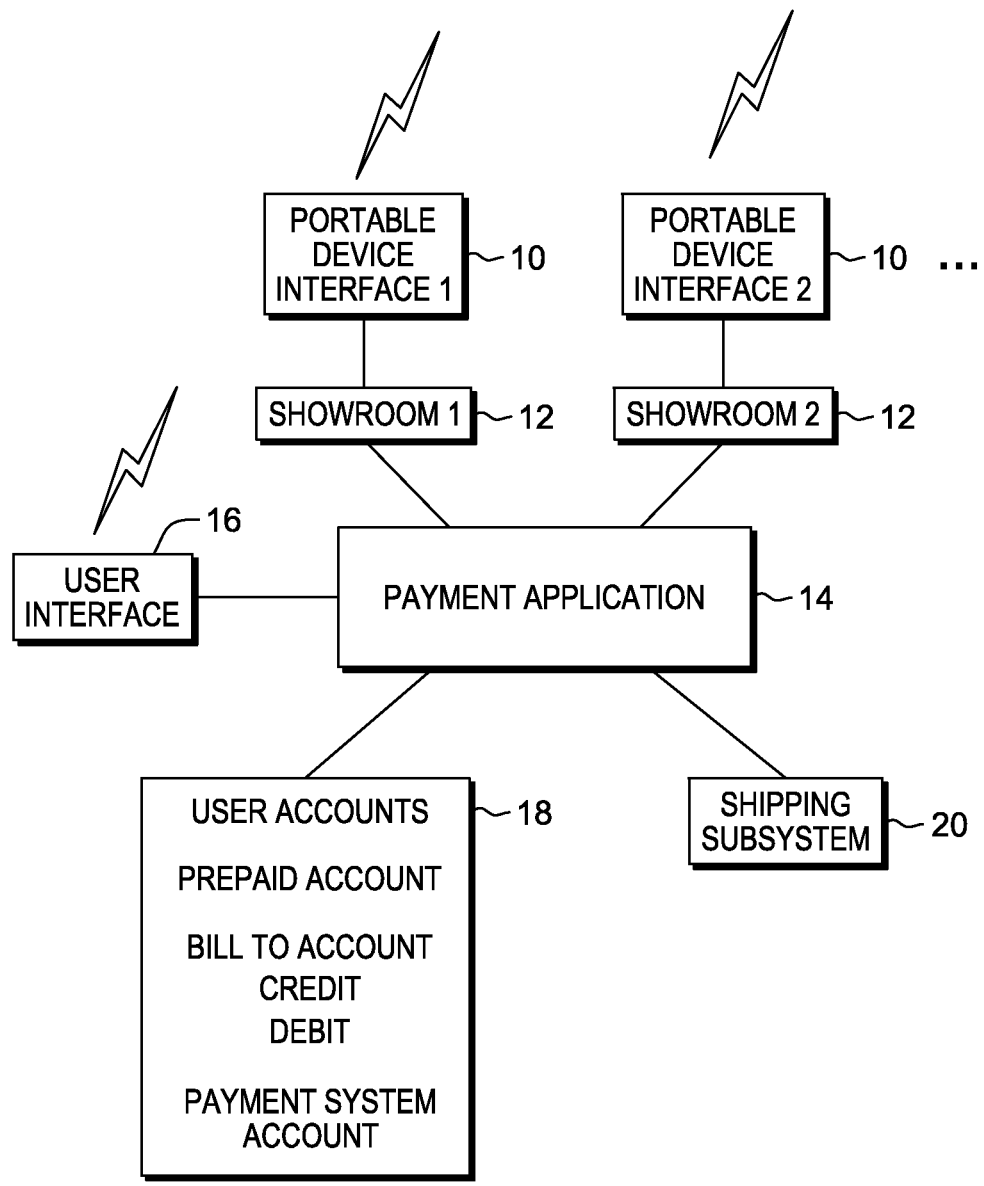
FIG. 1 is a diagram of a payment system according to the present invention.

In FIG. 1, there is shown a block diagram of an isolated payment system in accordance with one embodiment of the present invention. Showroom 1, 12, and Showroom 2, 12, comprise a plurality of retail merchandise showrooms. Additional showrooms (now shown) may also be present.

Showrooms may be real (brick and mortar) physical showrooms having real merchandise present on shelves and other display apparatus, such as hangers and racks. A customer having a portable personal device may enter the showroom, view and handle the merchandise. If this merchandise is an article of clothing, the customer may choose to try it on, look in a mirror or other device, solicit opinions from others in the showroom before making a decision to purchase the article.

Showrooms may also be online virtual stores. In this case, the customer does not physically enter a real showroom. Instead the customer enters a virtual store using her portable personal device or any other computing and display device to view the merchandise for sale. Such virtual showrooms in virtual stores are well known in the art. For example, U.S. Pat. No. 8,065,200 issued Nov. 22, 2011, entitled "Virtual Web Store with Product Images" and U.S. Pat. No. 8,253,727 issued Aug. 28, 2012, entitled "Creating a Web Store using Manufacturing Data," describe ways of constructing such virtual stores. U.S. Pat. Nos. 8,065,200 and 8,253,727 are incorporated by reference in their entireties herein for any purposes.

Showrooms may also be an online catalog, which is also accessed using the personal portable device or other computing device. An online catalog differs from an online showroom merely by the lesser extent of images presented to the customer, lesser textual description, or fewer features of the merchandise depicted.

Showrooms 12 are owned by a plurality of retailers. A retailer may own more than one showroom, as is commonly found today.

Within each showroom, there is located at least one wireless portable device interface 10. This may be a Wi-Fi hotspot (Wi-Fi is a registered trademark of Wi-Fi Alliance Corporation of California), a BLUETOOTH interface (BLUETOOTH is a registered trademark of Bluetooth Sig, Inc. of Delaware), or any other wireless interfaces known in the art capable of communicating with wireless personal portable devices carried by customers.

Wireless portable personal device interfaces 10 are not owned by the retailer, but instead belong to a payment company. Devices 10 are connected to server computer 14 owned by the payment company. A payment application runs on server computer 14 and interfaces with interface 10, as well as wireless user interface 16, which is not located in a showroom, but otherwise has the same interface capability as interfaces 10. A customer therefore can access the payment application running on server 14 whether or not the customer is located in a real or virtual showroom, and also from any other location having a user interface 16.

Payment application running on server 14 maintains and accesses a database of user accounts 18. Various types of user accounts are kept in the database. Prepaid accounts allow the customer to accumulate funds prior to their need to make payment for a purchase. The funds may be in various real and virtual currencies as agreed to by the payment company running the payment application. Virtual currencies include any type of e-currency known in the art including BITCOINS, BITCOIN is a registered trademark of Urban Trend, LLC of California. The payment application may also support creation, tracking, and use of virtual tokens as described in US Patent Application US2013/0325701 published Dec. 5, 2013 entitled "E-Currency Validation and Authorization Services Platform. US2013/0325701 shall be incorporated herein by reference in its entirety for any purpose.

When a customer chooses a payment application having prepaid accounts as described above and the retailer has accepted the credentials of that particular payment application, then a payment transaction is possible if the customer has a prepaid account with sufficient funds therein to make payment.

Other types of accounts may also be stored in the account database, including conventional debit and credit card type of accounts. The payment application may be configured to operate over a wireless interface directly with the customer's personal portable device to securely identify the account without the customer needing to have the relevant credit or debit card in hand at the time of payment.

Other new and unique customer accounts, referred to as a payment system account are also stored in the database of user accounts 18. A payment system account may allow payment to the retailer for remittance in pre-specified real currencies or virtual currencies provided the retailer agrees to such in the credentials. Virtual currencies may be any type of e-currency known in the art, including Bitcoin or tokens as described in US Patent Application US2013/0325701.

Remittance to the retailer from a payment system account may also be done according to a rule. For example, the rule may specify a time period for remittance in the pre-specified real or virtual currencies. The retailer may accept a credential with a rule which allows payment in a virtual currency, e.g., bitcoins only on the first three days of a monthly payment cycle, otherwise only US currency will be accepted.

Such a rule allows the retailer time to use the bitcoins received to pay his suppliers before another batch of bitcoins arrives the following month. The accepted credentials may include an even more specific rule. The rule may specify the payment remitted in a virtual currency cannot exceed the current level of accounts payable in that virtual currency for a corresponding, specified retailer. This rule insures that the retailer can use up that virtual currency by paying it to his own suppliers who will accept it and not build up a large balance in any virtual currency.

Even more specifically, the rule may further limit the virtual currency payment to have a ratio of virtual currency to total currency remitted to less than the ratio of accounts payable minus accounts receivable in the virtual currency to the total currency payable for that retailer.

A payment system account may also be an investment account having investments, such as stocks, bonds, commodities, collectibles, or the like owned by a customer. In one embodiment, the payment system manages the investments according to an agreement with the customer, to maintain sufficient liquidity of the investments to be able to remit payments to the retailers within specified periods and specified real and virtual currencies.

The payment system of FIG. 1 also includes in some embodiments shipping subsystem 20 attached to server computer 14. A customer having selected via a personal portable device, a payment company to handle payment for her purchases, may continue on the device to select a shipment method using shipping subsystem 20. Selection of a shipping company, priority, and delivery options are made using the wireless personal portable device. The customer may also select the same payment company used to remit the retailer to also remit the selected shipment company. Alternatively, she may select a different payment company, which may have different credentials regarding real and virtual currencies, and rules, to remit the shipping company.

Figure 2:
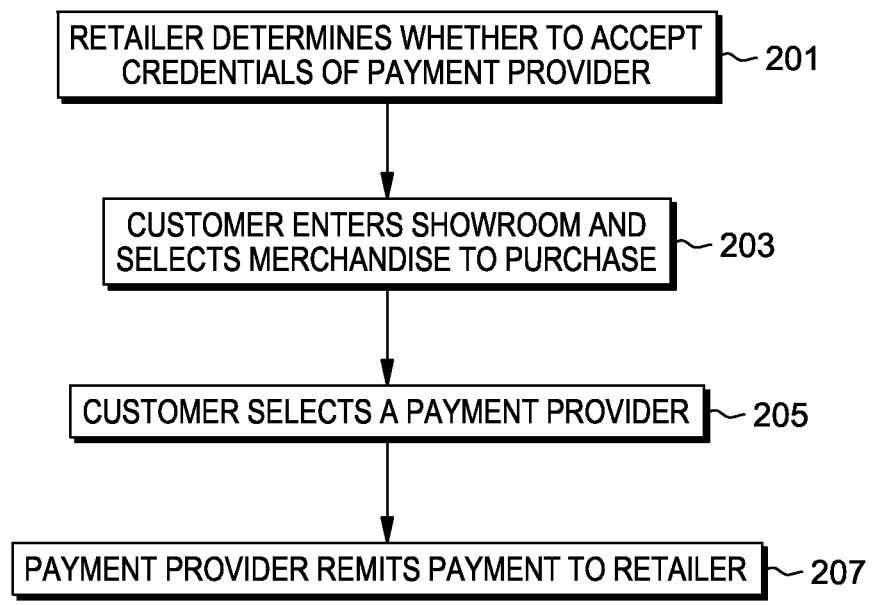
FIG. 2 is a flowchart of steps performed in practicing an embodiment of the present invention.

In FIG. 2, there is shown a flowchart depicting steps to be performed to practice one embodiment of the present invention. In step 201, a retailer determines whether to accept credentials of a payment provider. A payment provider is identical to the payment company described above. The credentials may include pre-specified real and virtual currencies, which may be used by the payment provider to remit payments to the retailer. The credentials may also have rules regarding virtual currencies for payment as described above with regard to FIG. 1 accounts.

In step 203, a customer having a personal portable device enters a real or virtual showroom and selects merchandise to purchase. In step 205, the customer uses her portable device to select a payment provider, which is a separate and different company from the retailer. Based on the customer's selection, the selected payment provider remits payment to the retailer in real or virtual currencies according to the credentials and rules accepted by the retailer.

In some embodiments of the invention, the customer may also use her personal portable device to select a shipping company. The customer may select the same or different company to remit payment to the selected shipping company.

FIG. 3 shows a block diagram of internal components 800 and external components 900 of a computer 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Computer 110 is representative of any electronic device capable of executing machine-readable program instructions. Computer 110 may be representative of a computer system or other electronic devices. Examples of computing systems, environments, and/or configurations that may be represented by computer 110 include, but are not limited to, personal computer systems, server computer systems, thin clients, thick clients, laptop devices, smart phones, multiprocessor systems, microprocessor-based systems, network PCs, minicomputer systems, and distributed cloud computing environments that include any of the above systems or devices.

Computer 110 includes a set of internal components 800 and external components 900. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, functions in computer device 110 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. Functions in computer 110 can be stored on one or more of the respective portable computer-readable tangible storage devices 936, read via the respective R/W drive or interface 832 and loaded into the respective hard drive 830.

Internal components 800 also includes audio adapters or interfaces 838 such as a sound card, hardware mixer, amplifier, or other adapters or interfaces for receiving audio signals from microphones.

Internal components 800 also includes network adapters or interfaces 836 such as a TCP/IP adapter cards, wireless Wi-Fi interface cards, or 3G or 4G wireless interface cards or other wired or wireless communication links. Functions in computer 110 can be downloaded to computer 110 from an external computer via a network (for example, the Internet, Cloud 24, a local area network or other, wide area network) and respective network adapters or interfaces 836. From the network adapters or interfaces 836. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

FIG. 3 may describe in more detail some of the computing resources comprising cloud 24.

In some embodiments, a processor, as described in connection with FIG. 3 may be included in the personal portable device for implementing various functions described above, including the steps of FIG. 2. The computer of FIG. 3 may be used to implement server 14 of FIG. 1 in some embodiments.

While there have been shown and described what are at present considered the preferred embodiment of the invention, it will be obvious to those skilled in the art that various changes and modifications may be made therein without departing from the scope of the invention as defined by the appended claims.

What is claimed is:

1. A payment system comprising:
    a server computer running a payment application having credentials;
    a plurality of wireless portable device interfaces connected to said server computer via a plurality of real or virtual showrooms owned by a plurality of retailers, which are visited by customers having portable devices;
    a wireless user interface attached to said server computer,
    user accounts stored in a database accessible by said payment application;
    a shipping subsystem accessible by said payment application, running on said server computer; and
    wherein said payment application is configured to receive acceptance of said credentials from said retailers, and to remit payment to said retailers based on interaction with one of said customer portable devices via said portable device interfaces or said user interface.

2. The payment system of claim 1, wherein said payment application receives acceptance of its credentials from said retailers for remittance in pre-specified real currencies or virtual currencies.

3. The payment system of claim 1, wherein said payment application receives acceptance of its credentials from said retailers for remittance according to a rule.

4. The payment system of claim 3, wherein said rule specifies a time period for remittance in pre-specified real or virtual currencies.

5. The payment system of claim 3, wherein said rule specifies the payment remitted in a virtual currency cannot exceed the current level of accounts payable in said virtual currency for a corresponding specified one of said retailers.

6. The payment system of claim 5, wherein said rule further limits said payment remitted to have a ratio of virtual currency to total currency remitted, to less than the ratio of accounts payable minus accounts receivable, in said virtual currency to total currency payable, for said specified one of said retailers.

7. The payment system of claim 1, wherein one of said user accounts is an investment account having investments owned by one of said customers.

8. The payment system of claim 7, wherein said payment system manages said investments according to an agreement with said customer to maintain sufficient liquidity of said investments for said remitting of payments to said retailers within specified periods and specified real and virtual currencies.

9. A method of handling payments to a retailer for retail merchandise, comprising the steps of:
   connecting a plurality of wireless portable device interfaces to a server computer via a plurality of real or virtual showrooms owned by a plurality of retailers, said device interfaces and server owned by a payment company separate from said retailers;
   customers having portable devices visiting said showrooms;
   said payment company running a payment application having credentials, on said server computer;
   providing a wireless user interface attached to said server computer,
   said payment company running a shipping subsystem accessible by said payment application, on said server; and
   said payment application receiving acceptance of said credentials from said retailers, and remitting payment to said retailers based on interaction with one of said customer portable devices via said portable device interfaces or said user interface.

10. The payment method of claim 9, wherein said payment application receives acceptance of its credentials from said retailers for remittance in pre-specified real currencies or virtual currencies.

11. The payment system of claim 9, wherein said payment application receives acceptance of its credentials from said retailers for remittance according to a rule.

12. The payment system of claim 11, wherein said rule specifies a time period for remittance in pre-specified real or virtual currencies.

13. The payment system of claim 11, wherein said rule specifies the payment remitted in a virtual currency cannot exceed the current level of accounts payable in said virtual currency for a corresponding specified one of said retailers.

14. The payment system of claim 13, wherein said rule further limits said payment remitted to have a ratio of virtual currency to total currency remitted, to less than the ratio of accounts payable minus accounts receivable, in said virtual currency to total currency payable, for said specified one of said retailers.

15. The payment system of claim 9, wherein one of said user accounts is an investment account having investments owned by one of said customers.

16. The payment system of claim 15, wherein said payment system manages said investments according to an agreement with said customer to maintain sufficient liquidity of said investments for said remitting of payments to said retailers within specified periods and specified real and virtual currencies.

17. A computer program product for operating a payment company, said computer program product comprising:
   a computer readable storage device;
   first program instruction means for connecting a plurality of wireless portable device interfaces to a server computer via a plurality of real or virtual showrooms owned by a plurality of retailers, said device interfaces and server owned by a payment company separate from said retailers;
   second program instruction means for detecting customers having portable devices visiting said showrooms;
   third program instruction means for said payment company running a payment application having credentials, on said server computer;
   fourth program instruction means for providing a wireless user interface attached to said server computer;
   fifth program instruction means for said payment company running a shipping subsystem accessible by said payment application, on said server; and
   sixth program instruction means for said payment application receiving acceptance of said credentials from said retailers, and remitting payment to said retailers based on interaction with one of said customer portable devices via said portable device interfaces or said user interface; and wherein
   all said program instruction means are recorded on said device.

* * * * *